US007148467B2

(12) United States Patent
Hoashi

(10) Patent No.: US 7,148,467 B2
(45) Date of Patent: Dec. 12, 2006

(54) OBJECT DETECTING APPARATUS HAVING CASE BREAKAGE DETECTING FUNCTION

(75) Inventor: Yoshiaki Hoashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/081,028

(22) Filed: Mar. 15, 2005

(65) Prior Publication Data

US 2005/0205764 A1    Sep. 22, 2005

(30) Foreign Application Priority Data

Mar. 18, 2004  (JP)  ............... 2004-078060

(51) Int. Cl.
*H01J 40/14* (2006.01)
*G08B 13/18* (2006.01)

(52) U.S. Cl. ...................... 250/221; 340/552
(58) Field of Classification Search .......... 250/221, 250/239; 340/552–557
See application file for complete search history.

(56) References Cited

U.S. PATENT DOCUMENTS 5,243,326 A * 9/1993 Disabato ............... 340/555
5,689,328 A   11/1997 Katayama .............. 356/4.01

FOREIGN PATENT DOCUMENTS

JP    2002-031685    1/2002

* cited by examiner

*Primary Examiner*—Thanh X. Luu
(74) *Attorney, Agent, or Firm*—Harness, Dickey & Pierce, PLC

(57) ABSTRACT

An object detecting apparatus for a vehicle has a light radiation unit and a light receiver unit disposed in a case having a light radiating window and a light receiving window for detecting an object or a distance to the object. The apparatus further has a case inside condition sensor for detecting a case inside condition, which changes when the case is broken. The case inside condition sensor may detect temperatures, humidity or pressures in the case. A breakage of the case is detected from a change in the detected case inside conditions. A case outside condition may be additionally used to detect the breakage of the case.

6 Claims, 3 Drawing Sheets

OBJECT DETECTING APPARATUS HAVING CASE BREAKAGE DETECTING FUNCTION

CROSS REFERENCE TO RELATED APPLICATION

This application is based on and incorporates herein by reference Japanese Patent Application No. 2004-78060 filed on Mar. 18, 2004.

FIELD OF THE INVENTION

The present invention relates to an object detecting apparatus mounted on a vehicle, for instance, for detecting an object such as a preceding vehicle or a distance to such an object by using an electromagnetic wave such as a laser light.

BACKGROUND OF THE INVENTION

A conventional object detecting apparatus mounted on a vehicle uses a laser light, for instance, to detect a distance to an object such as a preceding vehicle. This detecting apparatus periodically drives a laser diode to radiate the laser light towards the forward area of the vehicle, and detects the laser light reflected from the forward object by a photo sensor. The detecting apparatus measures the distance to the forward object based on a time difference between a light radiation time and a light reception time.

Specifically, as disclosed in JP 2002-031685A, the detecting apparatus comprises a light radiation unit for radiating a laser light, a polygon mirror and a light receiver unit for receiving a reflected laser light. The polygon mirror is shaped in a frustum of a hexagonal pyramid and rotatable as a scanning mirror.

This detecting apparatus is used in a harsh environment of a vehicle. Therefore, the above scanning parts, optical components, electronic circuits and the like are accommodated in a case to be protected from frosting of water or foreign material such as dust. The case has a light radiating window and a light receiving window, and those windows are air or fluid-tightly covered with transparent plates, respectively. Those transparent plates, however, may be subjected to flying stones, etc, which will break the transparent plates.

If the detecting apparatus is continuously used to detect the object or distance with the broken transparent plates, various foreign matters enter the case and various components inside the case will rust due to frosting. As a result, accurate object detection will be disabled.

SUMMARY OF THE INVENTION

It is therefore an object of the present invention to provide an object detecting apparatus, which is capable of detecting incomplete air or fluid-tightness due to breakage of a case.

According to the present invention, an object detecting apparatus for a vehicle has a wave radiation unit and a wave receiver unit disposed in a case having a wave radiating window and a wave receiving window for detecting an object or a distance to the object. The apparatus further has a case inside condition sensor for detecting a case inside condition, which changes when the case is broken. The case inside condition sensor may detect temperatures, humidity or pressures in the case. A breakage of the case is detected from a change in the detected case inside conditions. A case outside condition may be additionally used to detect the breakage of the case.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
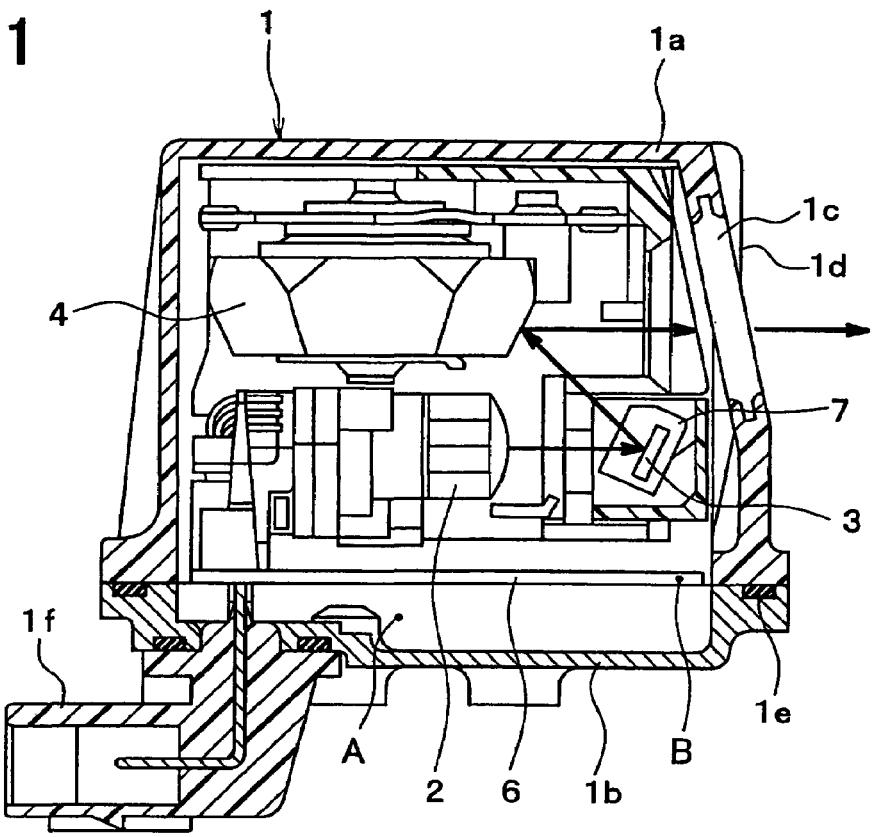
FIG. 1 is a sectional view of an object detecting apparatus according to a first embodiment of the present invention.
Figure 2:
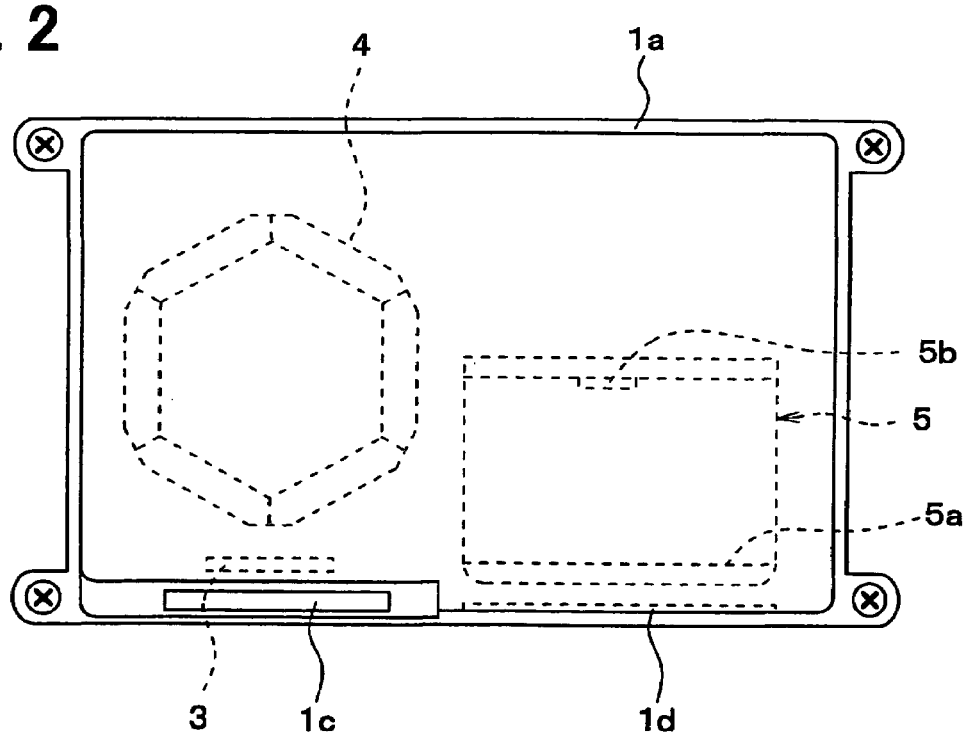
FIG. 2 is a schematic plan view of an arrangement of a polygon mirror and a light receiving unit and the like in the first embodiment.

Referring to FIGS. 1 and 2, an object detecting apparatus includes a case 1 shaped in a cuboid and various component parts accommodated in the case 1. The apparatus is mounted on a vehicle to be used as a laser radar. The apparatus is positioned to radiate a laser light (electromagnetic wave) in the forward direction of the vehicle, rightward direction in FIG. 1 and downward direction in FIG. 2, to detect a distance to a forward object such as a preceding vehicle during an auto-cruise control condition.

The case 1 includes a first case 1a and a second case 1b. The first case 1a is box-shaped and open at its one side (bottom side in FIG. 1). The first case 1a accommodates therein various component parts. The first case 1a has a light radiating window 1c and a light receiving window 1d arranged sidewise each other. The windows 1c and 1d may be made of light transmitting resin plate such as glass or acrylic resin.

The second case 1b is made of a plate-shaped resin. The cases 1a and 1b are fixed to each other with a sealing member 1e therebetween. The second case 1b has an electrical connector 1f made of resin. The connector 1f partly projects from the second case 1b to connect the electrical parts (not shown) provided inside and outside the case 1.

The case 1 (1a and 1b) accommodates a light radiation unit 2, a reflection mirror 3, a polygon mirror 4 and an electric circuit board 6. The circuit board 6 includes an electronic control circuit (FIGS. 3–6), which are connected to the light radiation unit 2, a light receiver unit 5 and the like to detect a forward object and measure the distance to the forward object. The light receiver unit 5 is positioned inside the case 1 to face the light receiving window 1d and includes a Fresnel lens 5a and a light receiving device 5b.

The light radiation unit 2 is driven by the control circuit 6a provided on the circuit board 6 and radiates the laser light towards the reflection mirror 3. The light radiation unit 2 may include a laser diode to radiate the laser light in the pulse form.

The reflection mirror 3 reflects the laser light radiated from the radiation unit 3 and directs it to the polygon mirror 4. The reflection mirror 3 is supported swingably to the case 1 by a support part 7 fixed to the inside wall of the case 1. For instance, the reflection mirror 3 may be driven by a motor (not shown) and controlled by the control circuit 6a of the circuit board 6 to adjust the direction of reflection. The reflection mirror 3 reflects the laser light toward the polygon mirror 4.

The polygon mirror 4 is shaped in a frustum hexagonal prism and supported by the case 1. The polygon mirror 4 is rotatable about an axis of the hexagonal prism. This mirror 4 is also driven by a motor (not shown) controlled by the control circuit 6a of the circuit board 6. The polygon mirror 4 has reflection mirror surfaces around its entire periphery, each of which operates as a scanning reflection mirror.

Specifically, the polygon mirror 4 reflects the laser light radiated from the radiation unit 2 and reflected by the reflection mirror 3, and directs the laser light toward the vehicle forward area through the radiating window 1c. As the polygon mirror 4 is rotated, the angle of the side face of the polygon mirror 4 changes. As a result, the angle of projection of the laser light is changed to scan a predetermined forward area of the vehicle.

The light receiver unit 5 includes the Fresnel lens 5a and the light receiving device 5b such as a photo diode. The Fresnel lens 5a collects the laser light reflected from the forward object and received through the receiving window 1d. The light receiving device 5b receives the laser light reflected by the forward object and received through the window 1d. The light receiving device 5b produces an output voltage or output current varying with the intensity of the received light. The output voltage or current is applied to the control circuit 6a of the circuit board 6.

The light receiver unit 5 is positioned sidewise from the polygon mirror 4. Namely it is displaced from the rotation axis of the polygon mirror 4 in the lateral direction. The circuit board 6 mounts thereon various electric circuits including the control circuit 6a.

The above object detecting apparatus becomes operable when an automatic cruise control switch provided in a vehicle compartment is turned on.

Specifically, during the vehicle running period, the reflection mirror 3 is motor-driven to a predetermined angle that is set for detecting an object. The light emitting unit 2 radiates the laser light at a predetermined time point, and the reflection mirror 3 and the polygon mirror 4 reflect the radiated laser light so that the laser light may be directed forward from the vehicle through the radiation window 1c as shown in FIG. 1.

When this laser light is reflected by an object such as a preceding vehicle running ahead, the reflected laser light enters into the case 1 through the light receiving window 1d. This reflected laser light is condensed by the Fresnel lens 5a and received by the light receiving device 5b.

The light receiving device 5b produces the output signal corresponding to the intensity of the received laser light, and this output signal is applied to the control circuit 6a. Thus, not only the presence of an object ahead of the vehicle is detected from the amplified output signal but also the distance (d) to the object is calculated as d=V×Td/2 as a function of the time difference (Td) between the laser light radiation time point and the laser light reception time point using the light travel speed (V).

This calculated distance may be supplied through the connector 1f to an engine control ECU or a brake control ECU (not shown), so that a vehicle engine or a vehicle brake device may be automatically regulated to maintain the desired distance to the preceding vehicle.

Figure 3:
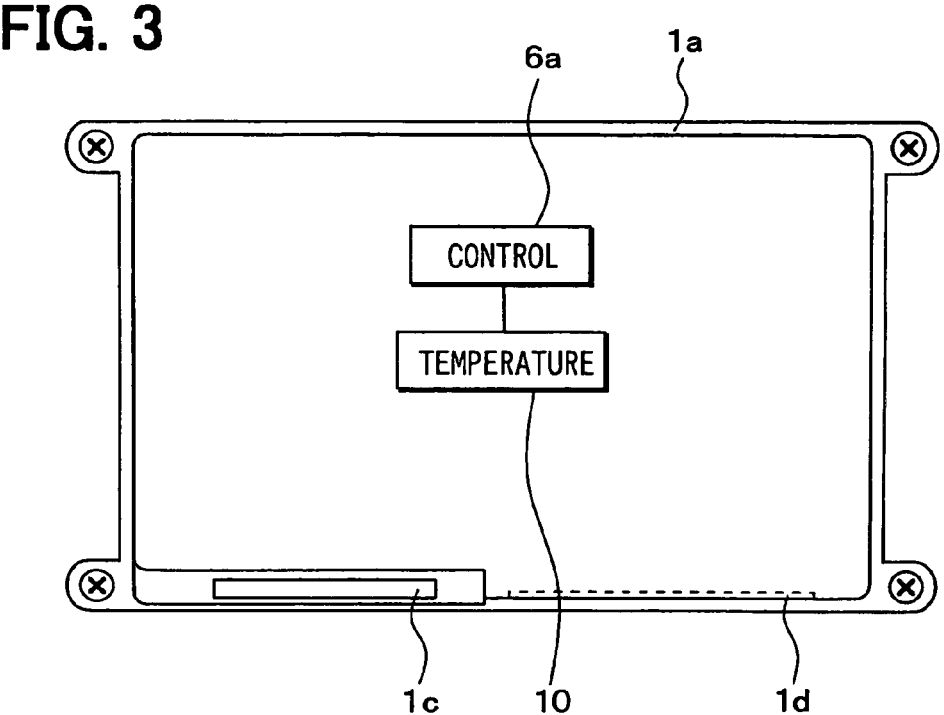
FIG. 3 is a schematic view of an arrangement of a temperature sensor and a control circuit in the first embodiment.

As shown in FIG. 3, a temperature sensor 10 is positioned in the case 1 as a case inside condition sensor to detect the temperature inside the case 1. During the above object detecting operation, the output signal of the temperature sensor 10 is applied to the control circuit 6a so that the control circuit 6a detects breakage or shattering of the case 1 including the windows 1c and 1d from the detected temperature inside the case 1.

Specifically, the control circuit 6a calculates a rate of change in the detected temperatures, and compares the change rate with a predetermined value to determine whether the case 1 (1c, 1d) is broken or shattered. The change rate do not change so much as long as the case 1 is not broken, because the inside temperature will change only slowly due to the heat capacity of the case 1. The change rate increases remarkably when the air or fluid-tightness is lessened due to breakage of the case 1, when outside air flows into the case 1. Thus, a large change rate of the detected temperatures indicates the shattering of the case 1.

An output signal indicative of the breakage of the case 1 is provided from the control circuit 6a to an outside part such as an instrument panel through the connector 1f. Thus, the breakage of the case 1 is informed to a driver, so that the case 1 may be repaired. As a result, it is restricted that foreign materials enter into the case 1 or various parts in the case 1 rust due to frosting.

As a modification of the first embodiment, a plurality of temperature sensors may be used to detect the breakage of the case 1. For instance, one temperature sensor may be provided at a position (A in FIG. 1) near the second case 1b, which is preferably made of die-cast aluminum, so that it has a comparatively large heat capacity due to the heat conductivity and specific heat of aluminum. Another temperature sensor may be provided at an edge (B in FIG. 1) of the circuit board 6, which is preferably made of epoxy glass, so that it has a comparatively small heat capacity due to the heat conductivity and specific heat of epoxy glass smaller than those of aluminum. The control circuit 6a calculates two rates of temperatures detected by respective temperature sensors, and determines whether the case 1 is broken or shattered based on a difference between the two calculated change rates.

Figure 4:
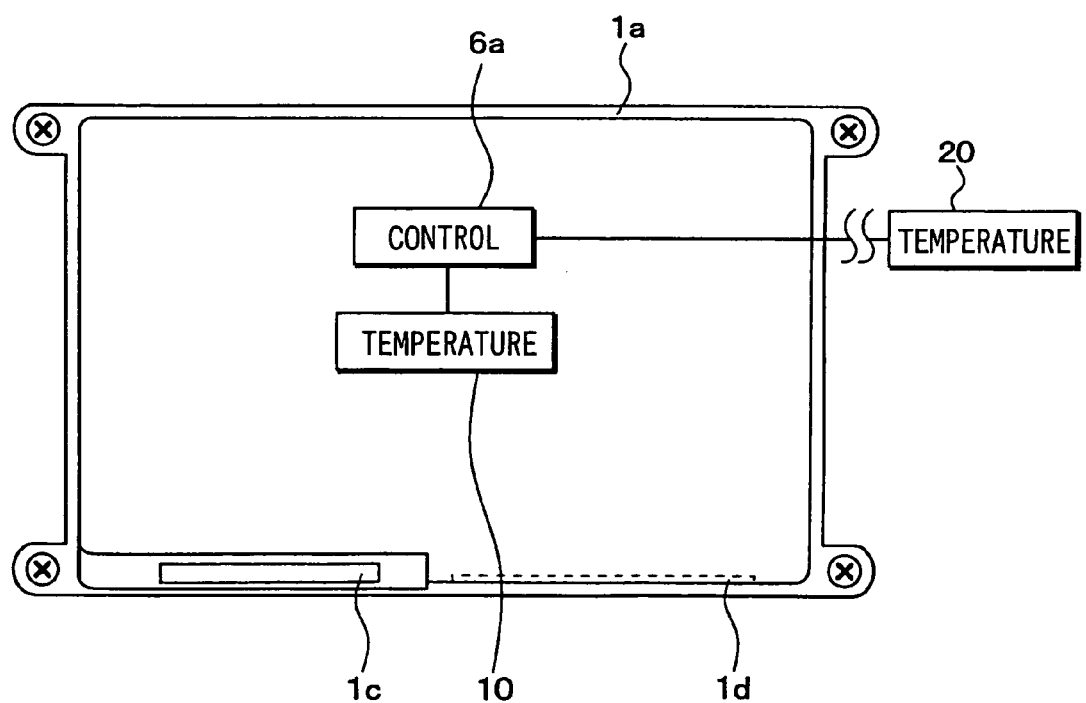
FIG. 4 is a schematic view of an arrangement of a temperature sensor and a control circuit in a modification of the first embodiment.

Further, as shown in FIG. 4, another temperature sensor 20 may be provided outside the case 1 as the case outside condition sensor for detecting the ambient temperature in addition to the temperature sensor 10 in the case 1. An output signal of the temperature sensor 30 is also applied to the control circuit 6a. The control circuit 6a calculates a rate of change of the ambient temperature detected by the temperature sensor 20, calculates a difference between the change rate of the temperatures inside the case 1 and the change rate of the temperatures outside the case 1, and determines the breakage of the case when the calculated difference exceeds a predetermined value.

The temperature sensor 20 may be a temperature sensor used in other apparatuses such as an air-conditioner apparatus, which are different from the object detecting apparatus.

(Second Embodiment)

Figure 5:
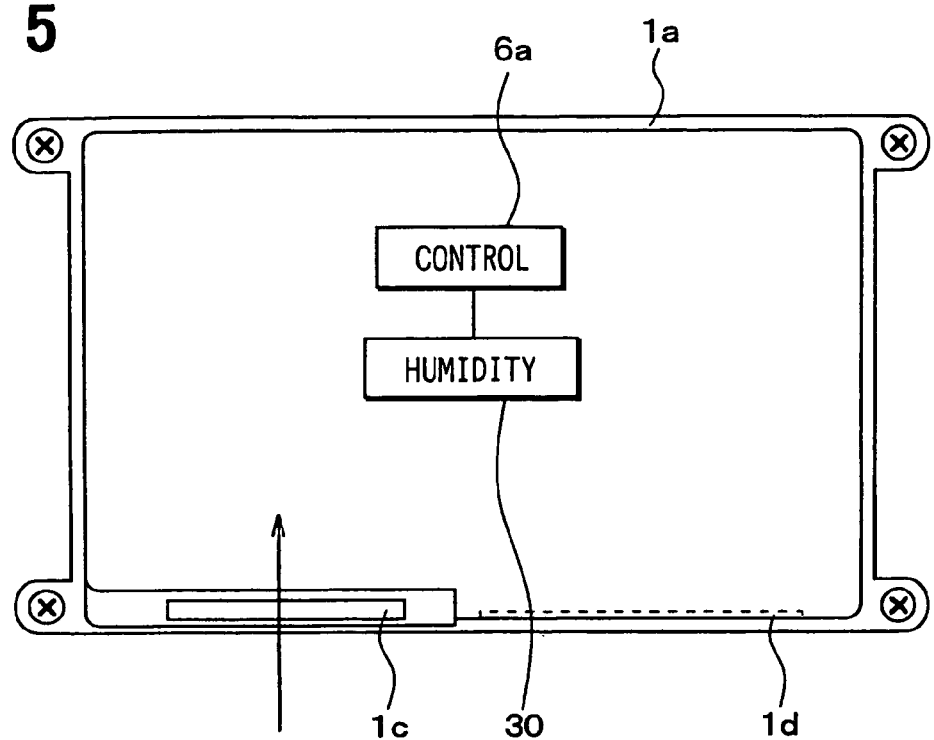
FIG. 5 is a schematic view of an arrangement of a humidity sensor and a control circuit in a second embodiment of the present invention.

In the second embodiment, as shown in FIG. 5, a humidity sensor 30 is provided in the case 1 as the case inside condition sensor to detect the humidity in the case 1. An output signal of the humidity sensor 6a is also applied to the control circuit 6a. The humidity in the case 1 changes greatly, when the case 1 is broken. The control circuit 60a calculates a change in the detected humidity and compares it with a predetermined value. The circuit 60a determines that the case 1 is broken when the calculated change rate exceeds the threshold value.

As a modification of the second embodiment, a temperature sensor 10 may be provided in the case 1 in addition to the humidity sensor 30. The temperature and the humidity in the case 1 normally have a certain relation therebetween as long as the case 1 is not broken. This relation may be determined experimentally.

The control circuit 6a calculates a relation between the temperature detected by the temperature sensor 10 and the humidity detected by the humidity sensor 30, and compares it with the experimentally determined relation. The control circuit 6a determines that the case 1 is broken when the calculated relation is outside an allowable deviation range determined from the experimentally determined relation.

(Third Embodiment)

Figure 6:
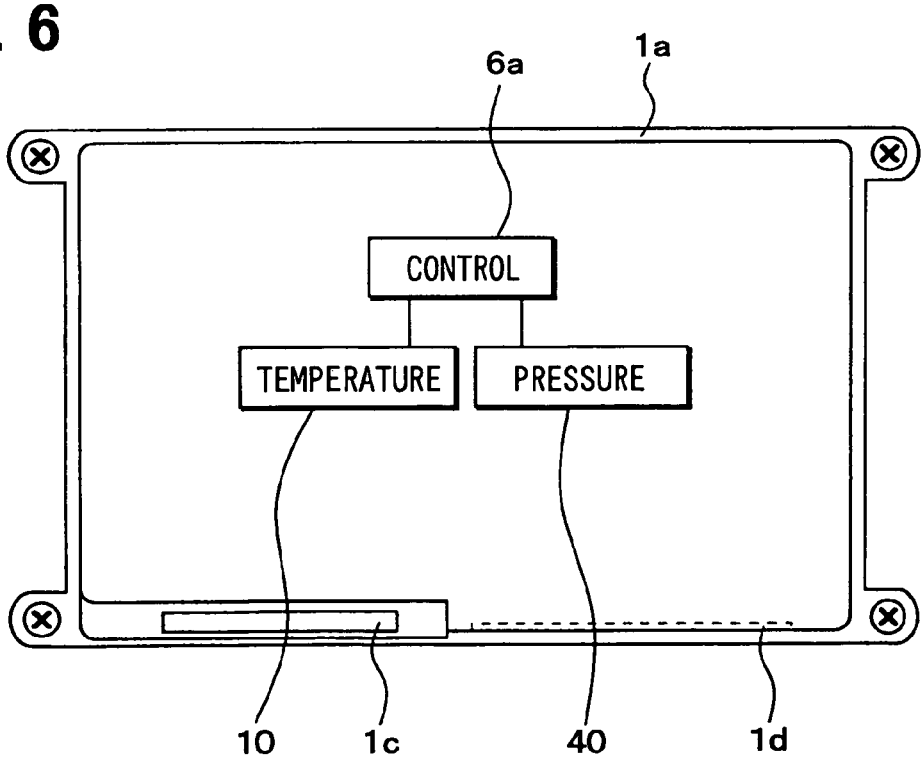
FIG. 6 is a schematic view of an arrangement of a temperature sensor, a pressure sensor and a control circuit in a third embodiment of the present invention.

In the third embodiment, as shown in FIG. 6, a pressure sensor 40 is provided in the case 1 as the case inside condition sensor to detect the inside pressure of the case 1 in addition to the temperature sensor 20. An output signal of the pressure sensor 40 is also applied to the control circuit 6a. The temperature and the pressure in the case 1 normally have a certain relation therebetween as long as the case 1 is not broken. This relation may be determined experimentally.

The control circuit 6a calculates a relation between the temperature detected by the temperature sensor 10 and the pressure detected by the pressure sensor 40, and compares it with the experimentally determined relation. The control circuit 6a determines that the case 1 is broken when the calculated relation is outside an allowable deviation range determined from the experimentally determined relation.

(Other Embodiments)

In the above embodiments, various parts of the case 1 and in the case 1 may be arranged differently. For instance, the light radiating window 1c and the light receiving window 1d may be arranged in the vertical direction. Further, various electromagnetic waves other than the laser light may be used.

The present invention should not be limited to the disclosed embodiments and modifications, but may be implemented in many other ways.

What is claimed is:

1. An object detecting apparatus for detecting an object, the apparatus comprising:
   a case having a wave radiating window and a wave receiving window;
   a wave radiation unit, disposed in the case, for radiating a wave through the wave radiating window;
   a wave receiver unit, disposed in the case, for receiving the wave reflected by an object and entering through the wave receiving window;
   case inside condition sensing means, disposed in the case, for detecting a case inside condition which changes when the case is broken, wherein
   the case inside condition sensing means includes a temperature sensor for detecting inside temperatures in the case; and
   circuit means for determining a breakage of the case based on the case inside condition detected by the case inside condition sensing means, wherein
   the circuit means calculates a rate of change of the inside temperatures and determines the breakage of the case based on the calculated rate.

2. An object detecting apparatus for detecting an object, the apparatus comprising:
   a case having a wave radiating window and a wave receiving window;
   a wave radiation unit, disposed in the case, for radiating a wave through the wave radiating window;
   a wave receiver unit, disposed in the case, for receiving the wave reflected by an object and entering through the wave receiving window;
   case inside condition sensing means, disposed in the case, for detecting a case inside condition which changes when the case is broken, wherein
   the case inside condition sensing means includes two temperature sensors for detecting inside temperatures at a large heat capacity part and a small heat capacity part in the case, respectively; and
   circuit means for determining a breakage of the case based on the case inside condition detected by the case inside condition sensing means, wherein
   the circuit means calculates respective rates of changes of the inside temperatures and determines the breakage of the case based on the calculated difference.

3. An object detecting apparatus for detecting an object, the apparatus comprising:
   a case having a wave radiating window and a wave receiving window;
   a wave radiation unit, disposed in the case, for radiating a wave through the wave radiating window;
   a wave receiver unit, disposed in the case, for receiving the wave reflected by an object and entering through the wave receiving window;
   case inside condition sensing means, disposed in the case, for detecting a case inside condition which changes when the case is broken;
   circuit means for determining a breakage of the case based on the case inside condition detected by the case inside condition sensing means
   an outside temperature sensor, disposed outside the case, for detecting outside temperatures of the case,
   wherein the case inside condition sensing means includes an inside temperature sensor for detecting inside temperatures in the case, and
   wherein the circuit means calculates respective rates of changes of the outside temperatures and the inside temperatures, calculates a difference between the calculated rates of changes, and determines the breakage of the case based on the calculated difference.

4. An object detecting apparatus for detecting an object, the apparatus comprising:
   a case having a wave radiating window and a wave receiving window;
   a wave radiation unit, disposed in the case, for radiating a wave through the wave radiating window;
   a wave receiver unit, disposed in the case, for receiving the wave reflected by an object and entering through the wave receiving window;
   case inside condition sensing means, disposed in the case, for detecting a case inside condition which changes when the case is broken, wherein
   the case inside condition sensing means includes a humidity sensor for detecting inside humidity in the case; and
   circuit means for determining a breakage of the case based on the case inside condition detected by the case inside condition sensing means, wherein
   the circuit means calculates a rate of change of the inside humidity and determines the breakage of the case based on the calculated rate.

5. An object detecting apparatus for detecting an object, the apparatus comprising:
- a case having a wave radiating window and a wave receiving window;
- a wave radiation unit, disposed in the case, for radiating a wave through the wave radiating window;
- a wave receiver unit, disposed in the case, for receiving the wave reflected by an object and entering through the wave receiving window;
- case inside condition sensing means, disposed in the case, for detecting a case inside condition which changes when the case is broken, wherein
- the case inside condition sensing means includes a temperature sensor for detecting inside temperatures in the case and a humidity sensor for detecting inside humidity in the case; and
- circuit means for determining a breakage of the case based on the case inside condition detected by the case inside condition sensing means, wherein
- the circuit means calculates a relation between the detected inside temperatures and the detected inside humidity and determines the breakage of the case based on the calculated relation.

6. An object detecting apparatus for detecting an object, the apparatus comprising:
- a case having a wave radiating window and a wave receiving window;
- a wave radiation unit, disposed in the case, for radiating a wave through the wave radiating window;
- a wave receiver unit, disposed in the case, for receiving the wave reflected by an object and entering through the wave receiving window;
- case inside condition sensing means, disposed in the case, for detecting a case inside condition which changes when the case is broken, wherein
- the case inside condition sensing means includes a temperature sensor for detecting inside temperatures in the case and a pressure sensor for detecting inside pressures in the case; and
- circuit means for determining a breakage of the case based on the case inside condition detected by the case inside condition sensing means, wherein
- the circuit means calculates a relation between the detected inside temperatures and the detected inside pressures and determines the breakage of the case based on the calculated relation.

* * * * *